United States Patent [19]

Reiss

[11] 4,076,320
[45] Feb. 28, 1978

[54] DOWN FILLING MACHINE

[76] Inventor: David Reiss, 1315 Davenport Road, Toronto, Ontario M6H 2H4, Canada

[21] Appl. No.: 645,267

[22] Filed: Dec. 29, 1975

[30] Foreign Application Priority Data

Apr. 11, 1975  Canada ................................. 234434

[51] Int. Cl.² ........................................... B65G 53/28
[52] U.S. Cl. ......................................... 302/3; 302/23
[58] Field of Search ............................ 302/3, 21–23, 302/53; 222/56, 58, 77, 193; 141/67, 83; 177/25, 64, 66, 116, 119, 120, 164, 165, 229

[56] References Cited

U.S. PATENT DOCUMENTS

| 2,688,518 | 9/1954 | Krenke | 302/3 |
|---|---|---|---|
| 2,795,463 | 6/1957 | Weller | 302/3 |
| 2,969,228 | 1/1961 | Appius | 177/229 |
| 3,307,646 | 3/1967 | Hage | 302/23 |
| 3,693,836 | 9/1972 | Eisner | 222/77 |
| 3,731,754 | 5/1973 | Godwin et al. | 177/165 |
| 3,797,890 | 3/1974 | Walters | 302/22 |
| 3,942,840 | 3/1976 | Foster | 302/3 |

Primary Examiner—Evon C. Blunk
Assistant Examiner—Jeffrey V. Nase
Attorney, Agent, or Firm—Martin R. Greenstein

[57] ABSTRACT

An apparatus for weighing and discharging material such as down, feathers, and the like is disclosed. Feathers, down and the like are transported from a storage container to a weighing drum by means of a flow of air which passes horizontally into and through the weighing drum, whereby the feathers are deposited in the drum. When a desired weight has accumulated, the flow of air to the drum is diverted and the accumulation of feathers may be discharged from the drum. Upon completion of the discharge, the flow of air carrying feathers is again directed into the drum.

8 Claims, 6 Drawing Figures

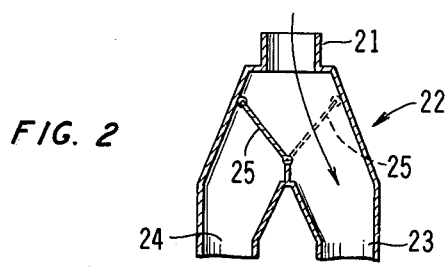
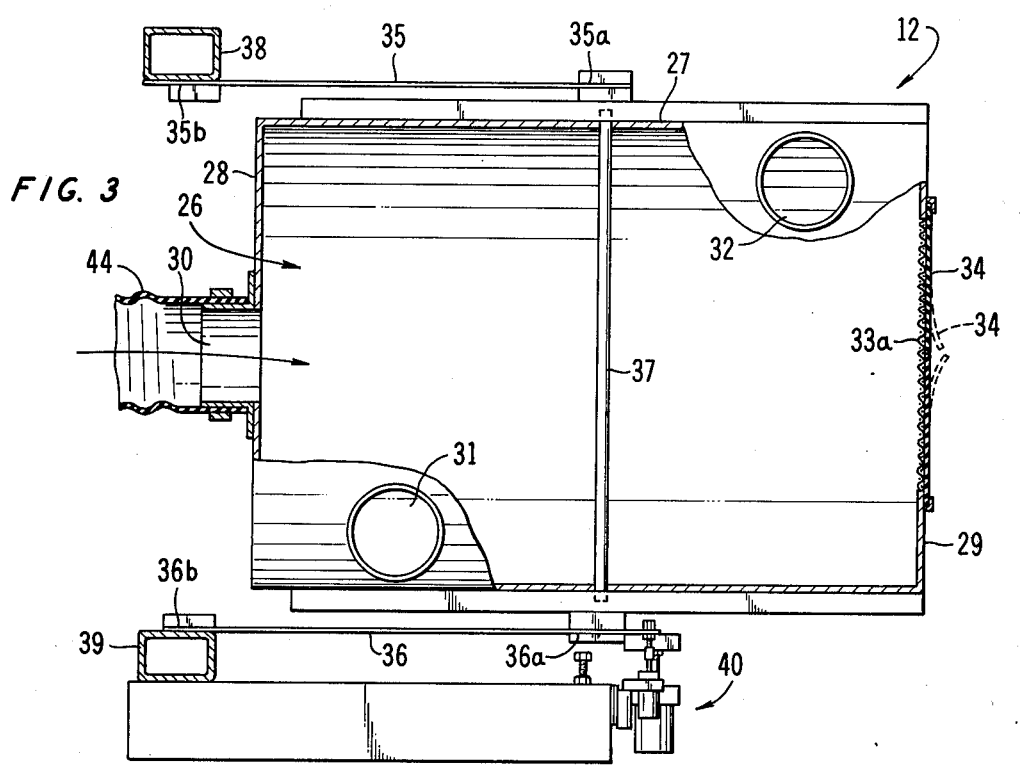
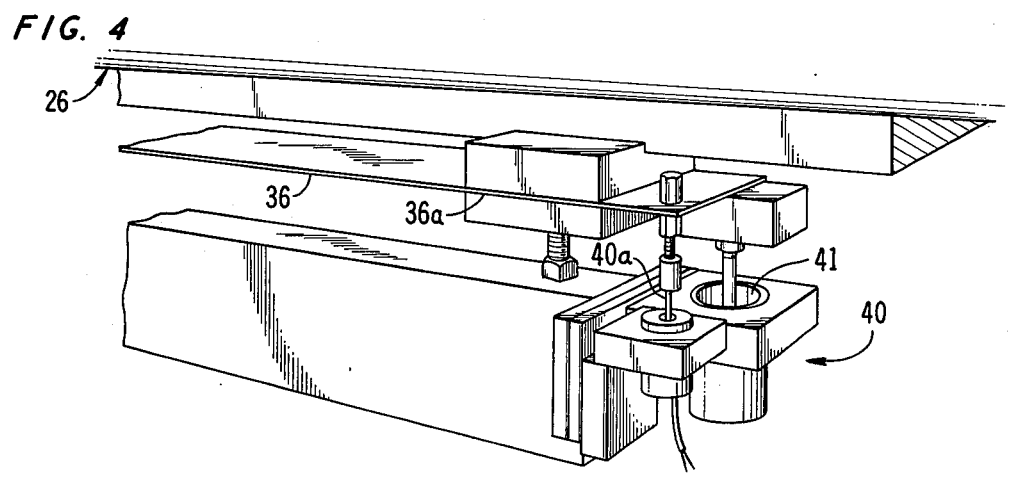

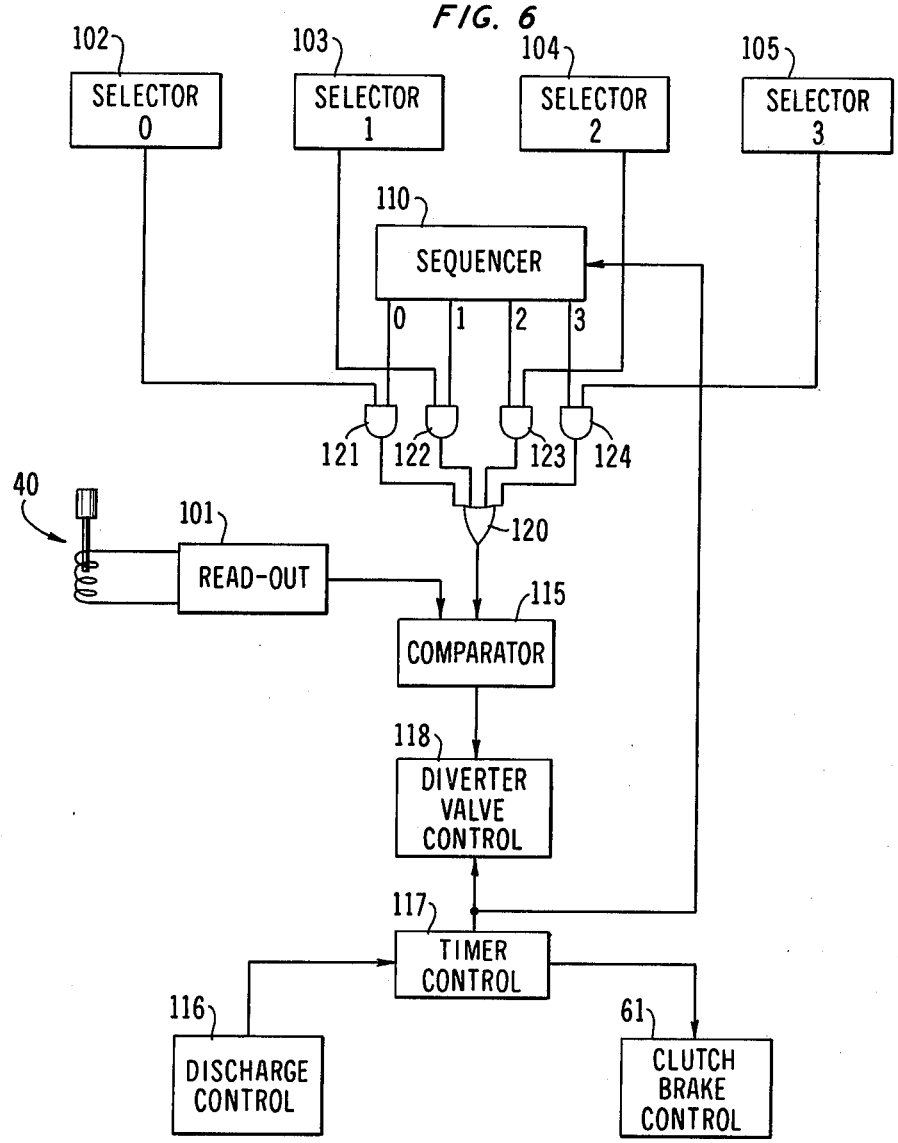

DOWN FILLING MACHINE

BACKGROUND OF THE INVENTION

1. Field of the Invention

This invention relates to an apparatus for measuring and transporting a desired weight of material such as feathers, down and the like to a discharge station for discharge into garments and the like to provide insulation.

2. Description of the Prior Art

Feathers, down and the like may be used in garments, sleeping bags, pillows, upholstery and the like. Garments and other articles in which such material is used generally consist of several sections, each requiring a measured quantity of the material. An insufficient quantity causes poor insulation and an excessive quantity results in waste of expensive down.

Prior art systems are known which use feather weighing and transporting arrangements. In one prior art system feathers, down and the like are transported from a storage bin to a hopper located directly above a scale. Rotating blades allow a quantity of down to drop onto the scale and when a desired weight is reached, rotation of blades is stopped. In some cases an operator may be required to add or remove an amount of the material to reach the desired weight. Prior art arrangements such as the system described, generally lack accuracy and speed of operation.

SUMMARY OF THE INVENTION

It is an object of the present invention to provide an apparatus for rapidly filling garments and the like with accurately measured quantities of feathers, down and the like.

In accordance with this invention apparatus for weighing and discharging a desired weight of material such as feathers, down and the like comprises a storage station, a weighing station and a discharge station and means for transporting the material by a flow of air from the storage station to the weighing station. The flow of air transporting the feathers passes substantially horizontally into and through a container in the form of a drum at the weighing station and the feathers, down and the like are depositied in the drum as they fall out of the flow of air passing through it. The drum is mounted on cantilever springs and as the weight of the collected feathers increases, the drum is proportionally displaced vertically downwardly. A sensing device measures the downward displacement of the drum. When the desired weight has been reached, a diverter valve is actuated to divert the flow of air from the weighing station. The weighed quantity of feathers, down and and the like may be transported from the weighing station to the discharge station by means of a flow of air. After the discharging operation is terminated, the diverter valve is actuated to fill the drum once again. Electronic circuitry is employed to control the filling of the drum and to halt the filling operation when a desired weight is reached. A sequencing circuit and plurality of selector switches are employed to measure differing quantities in sequence.

BRIEF DESCRIPTION OF THE DRAWING

FIG. 2 is a cross-sectional view of the diverter valve of FIG. 1;

FIG. 3 shows a cross-section of the weighing drum of FIG. 1;

FIG. 4 is an enlarged perspective view of the measuring and sensing device suspended below the weighing drum.

FIG. 5 is a representation of a plurality of electronic switches and an electronic digital read-out;

FIG. 6 is a schematic diagram of electronic control circuitry according to a preferred embodiment of the invention.

DETAILED DESCRIPTION

Figure 1:
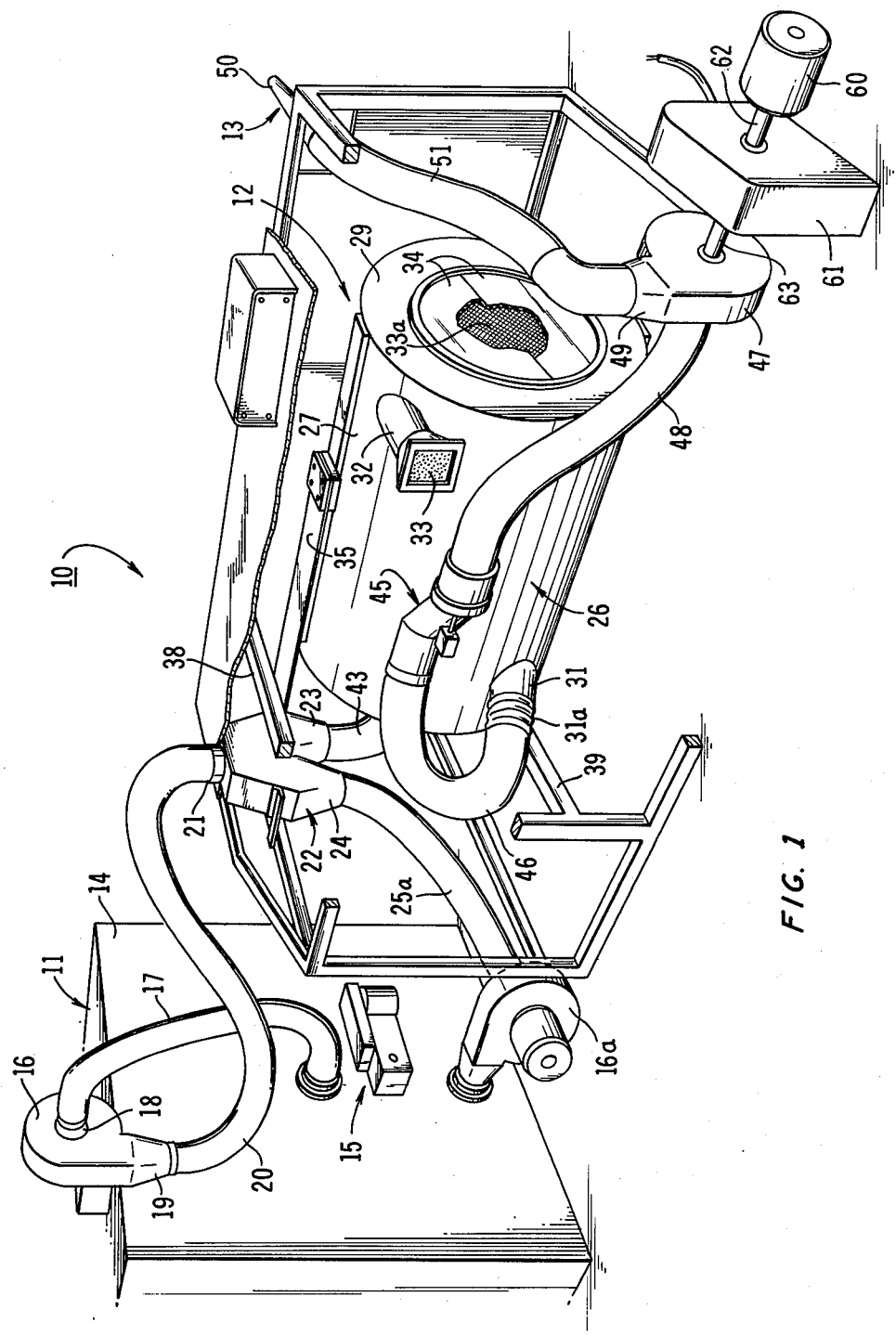
FIG. 1 is a perspective view of down weighing and filling apparatus according to a preferred embodiment of the invention.

With reference to the drawings, there is generally shown at 10 an apparatus for transporting and weighing a desired quantity of feathers, down and the like and discharging same into garment panels, and the like, comprising a storage station 11, a weighing station 12 and a discharge station 13.

The storage station 11 comprises a storage compartment 14 within which the feathers, down and the like are contained. A known mechanical agitating device generally indicated at 15 assists in preventing the down from settling and packing in storage compartment 14. Fans 16 and 16a will be continously operated while the down weighing and filling machine is in use. A diverter valve 22 serves to direct the flow of air from fan 16 either to the weighing station 12 or to the fan 16a for return to the storage station 11. The two fans will serve to maintain the feathers, down and the like in a loose state when the diverter valve is in the by-pass state. Hoses 17, 20 and 25 serve to interconnect the storage station to the fans and the diverter valve.

Diverter valve 22 has outlets 23 and 24 and a gate 25 which closes off either outlet 23 or outlet 24. As can be more clearly seen from FIG. 2, when gate 25 is in the position shown in FIG. 2 (hereinafter referred to as the "fill position"), the flow of air and feathers and the like is from intake 21 through diverter valve 22 and through outlet 23 to the drum 26. When gate 25 is in the position shown by the dotted line in FIG. 2 (hereinafter referred to as the "by-pass position"), the flow is through outlet 24, through hose 25a, fan 16a, and back into storage compartment 14. Thus, with gate 25 in the dotted position as shown in FIG. 2, the feathers, down and the like are continuously re-circulated to compartment 14.

The weighing station generally designated at 12 comprises a hollow cylindrical drum 26, having a cylindrical wall 27 and end walls 28 and 29. In end wall 28, an inlet opening 30 is located as shown in FIG. 3. A discharge outlet 31 is located in cylindical wall 27 near the bottom of cylindrical drum 26.

Located above and below cylinder 26 are cantilever springs 35 and 36 respectively as shown in FIG. 3. End 35a of cantilever spring 35 is fixedly secured to the top of the cylindrical drum 26 and end 36a of cantilever spring 36 is fixedly secured to the bottom of the cylindrical drum 26. A steel rod 37 is located inside cylindrical drum 26 and joins 35a and 36a of cantilever springs 35 and 36 respectively. The end 35b of cantilever spring 35 is fixedly secured to a frame member 38 and end 36b of cantilever spring 36 is fixedly secured to a frame member 39. Thus, as can be seen from FIG. 3, the cylindrical drum 26, which forms part of the weighing station 12, is suspended by cantilever springs 35 and 36 and is only allowed to move in the vertical direction.

The end 36a of the lower cantilever spring 36 is connected to a known Linear Variable Differential Transformer (LVDT) sensing device 40. The LVDT is an electro-mechanical transducer capable of producing an electrical signal which varies in proportion with the displacement of a moveable core. In its simplest form, the LVDT has three equally spaced coils in a cylindrical coil form. A magnetic moveable core is positioned axially inside the coil assembly. When the center coil is energized, voltages are induced in the two outer coils, which voltages are directly proportional to the distance that the magnetic core is axially displaced from the centre coil null point. In this embodiment, the moveable core is attached to the end 36a of cantilever spring 36 by means of shaft 40a. Thus, the vertical movement of the cylindrical drum 26 causes the magnetic core to move axially within the cylindrical coil from thus causing a variation in the voltages being induced in the end coils. The signal from the LVDT may be calibrated and displayed on a digital electronic read-out device such that the read-out is directly proportional to the weight (e.g. in grams) of the feathers contained in the cylindrical drum 26.

Located on end wall 29 and co-axial with the inlet opening 30 is a screened opening 33a. The screening opening 33a is covered by split flaps 34 as more clearly shown in FIG. 3, which allow air to escape from drum 26 but prevent air from entering therethrough into drum 26.

The inlet 30 of the drum 26 is in communication with outlet 23 of the diverter valve 22 by means of hose 43 and flexible coupling 44. The flexible coupling 44 is employed to permit free movement of the drum 26 relative to hose 43.

The discharge station is generally designated at 13. The discharge nozzle 50 is connected to the discharge outlet 31 by means of hose 51, fan 47, hose 48, control valve 45, and hose 46. Hose 46 is connected to outlet 31 by means of a flexible coupling 31a to permit free movement of the drum 26 relative to hose 46.

Located near the top and on the same half of the cylindrical drum 26 as discharge outlet 31 is a fresh-air intake opening 32. The fresh-air intake opening 32 has a flap 33 which permits a uni-direction flow of air into the drum 26 when air and feathers are withdrawn through outlet 31.

With gate 25 in the position as shown in FIG. 2, the feathers are transported through outlet 23, hose 43, flexible coupling 44, and through inlet 30 into drum 26. The air will flow horizontally into the drum 26 and with valve 45 in a closed position will escape from the drum through screened opening 33a as permitted by flaps 34. Flap 33 at opening 32 precludes airflow out of drum 26 through opening 32 since it only permits flow of air into the drum 26.

As the air flows into and through drum 26 from inlet 30 to opening 33a, the feathers in the flow of air are deposited inside the drum. Since screened opening 33a is opposite inlet 30 and since the airflow carrying the feathers and the like enters drum 26 horizontally, most of the air will be directed out through screened opening 33a and there will be almost a negligible amount of air flowing up or down end wall 29 to cause any turbulence. The LVDT sensing device 40 which only measures vertical movement of the drum is thus unaffected by the air flowing horizontally into and through drum 26.

Further shown in FIG. 4 is a dashpot 41 such as may be used in conjunction with the LVDT sensing device 40 to dampen the movements of the drum 26. LVDT devices are known which are capable of measuring displacement of twenty-five millionth of an inch or less (approximately 5 mm). Hence the weight of feathers in the drum may be determined with a high degree of accuracy.

In addition to accuracy, the speed of operation of machines for filling garments and the like with down, feathers and the like is of great importance in the industry. To avoid delay due to start-up time of electric motors, the motors driving fans 16, 16a and 47 are running continuously while the machine is in use. As explained earlier, the flow of air from bin 14 will be directed into the drum 26 or returned to the bin 14 under control of the diverter valve 22. The electric motor 60 is coupled to the fan 47 by means of an electrically operated brake-clutch combination generally indicated by 61 in FIG. 1. Such combinations are well-known and commercially available. In normal operation the motor 60 will be running continuously and, in response to an electrical signal, which may be referred to as an "engage" signal, the clutch mechanism will engage the motor shaft 62 to the fan shaft 63. In response to a "disengage" signal the clutch mechanism will disengage the two shafts and simultaneously apply a magnetic braking force to the shaft 63, stopping the rotation of the fan. The fan 47 may be so constructed that the stopped fan will present a high resistance flow of air such that only a negligible amount of air will escape through the fan even when air is blown into the drum 26 during a filling operation. In such case, the control valve 45 is superfluous and may be omitted.

Apparatus for the automatic control of the machine is generally shown in schematic form in FIG. 6. Assuming that the drum is initially empty, automatic operation will be as follows:

1. Diverter valve is placed in the fill position;
2. When desired weight is reached, the diverter valve is returned to the by-pass position;
3. In response to an operator signal, the clutch 61 is engaged and control valve 45 is opened to discharge the measured quantity via discharge nozzle 50;
4. When the drum 26 has been emptied, the clutch 61 is disengaged, the control valve 45 is closed and the diverter valve 22 is again placed in fill position.

The above-noted operations will be discussed with reference to FIG. 6. Since control valve 45 is superfluous under certain circumstances, no further reference will be made thereto in the discussion of the automatic operation.

As mentioned earlier, the electrical signal generated by the transducer 40 may be transmitted to an electronic read-out calibrated to reflect the weight of the down deposited in the drum 26. For the purposes of this discussion, it will be assumed that the read-out has been calibrated to show the weight of feathers in grams. A read-out device is generally shown at 101 in FIG. 6. It is common practice in the industry to fill the various pockets of a garment with varying amount of feathers, down and the like depending upon the intended use of the garment and the size of the pocket to be filled. It is not uncommon that one garment has three or four pockets, each of which is to receive a different weight of down. To obtain the desired weight, means has been provided whereby an operator may select the weight of feathers to be deposited in the drum. An electrical selector switch, as for example a well-known thumbwheel switch may be set to the number of grams desired. Such selector switches are generally indicated by the numbers 102, 103, 104, and 105 in FIG. 6. A sequencing circuit 110 has been provided which, in cooperation with the selector switches, allows the operator to choose four different amounts to be weighed in drum 26, in sequence. Sequencing circuits which will step through four stages in sequence, in response to an advance signal, are well-known. For discussion purposes, it will be assumed that the sequencing circuit is in the "0" state thereby enabling AND-gate 121. Accordingly, information reflecting the state of selector switch 102 will be transmitted through AND-gate 121, OR-gate 120 to the comparator circuit 115. An electronic comparator circuit such as generally represented by circuit 115 may be readily adapted to generate an output signal when a match is detected between information reflecting the value of the read-out 101 and information reflecting the value of the selector switch. A match between these two values indicates that the desired weight has been attained in drum and the comparator output signal may be used to place the diverter valve 22 in the bypass state. The weighed quantity of feathers is now ready for discharge. A discharge control 116, which may be in the form of a foot operated switch, is provided to allow the operator to initiate the discharge operation. The discharge control will activate a timer control 117 which in turn will apply a signal to the clutch-brake control to start the discharge fan 47, as discussed earlier herein. The time required for the discharge operation may be empirically determined and the time control set accordingly. As an example, it has been found in a prototype machine that a quantity of 80 grams may be discharged in approximately 5 seconds. At the end of the period set by the timer, the clutch-brake will be disengaged to stop rotation of the fan 47 and the diverter valve, under control of the diverter valve control 118, will be actuated to the fill position. The sequencer 110 will be advanced to the next state and the desired quantity of feathers indicated by the next selector switch (e.g. 103) will be deposited in the drum 26, where it will remain until the discharge control is once again actuated by the operator. Since the filling operation is a matter of only a few seconds, the machine will usually be ready for discharge before the operator has had an opportunity to place the next garment to be filled on the nozzle 50.

While the invention has been described with reference to a specific embodiment, it will be understood that the same is merely an illustration of the application of the principles of the invention and that numerous other arrangements may be devised by those skilled in the art without departing from the spirit and scope of the invention.

What is claimed is:

1. Apparatus for weighing material such as down feathers, and the like, comprising a storage bin for storing said material, a frame member, a cylindrical drum having its longitudinal axis disposed horizontally and supported from said frame member by means of first and second spaced apart parallel cantilever springs affixedly secured to said frame member and to points at the top and bottom of said drum, respectively, whereby said drum is allowed to move in the vertical direction; said apparatus further comprising means for measuring vertical displacement of said drum and for generating output signals indicative of said displacement, transport means for transporting said material from said bin to said drum by means of a flow of air;

said drum having first and second vertical walls, a first opening in said first wall having a cross sectional area substantially smaller than the cross sectional area of said drum communicating with said transport means; and a second opening in said second wall in substantial axial alignment with said first opening, a discharge outlet opening in the cylindrical wall of said drum located in proximity of the lower edge and on one side of said drum and an air inlet opening in said cylindrical wall and on said one side of said drum located in proximity of the upper edge of said drum.

2. Apparatus in accordance with claim 1 wherein said apparatus further comprises:
a discharge nozzle;
fan means connected to said discharge outlet and said discharge nozzle for generating a flow of air from said discharge outlet to said nozzle and for transporting said material from said drum to said nozzle;
power drive means for operating said fan;
clutch means for selectively engaging and disengaging said power drive means and said fan means; and
brake means for braking said fan.

3. Apparatus in accordance with claim 1 wherein said transport means comprises:
valve means having a valve inlet, first and second valve outlets, and a valve gate for selectively connecting said valve inlet to said first valve outlet and said second valve outlet;
fan means connected to a first opening in said storage bin and to said valve inlet for generating a flow of air from said storage bin to said valve means;
said first valve outlet being connected to said first opening of said drum and said second valve outlet being connected to a second opening in said storage bin.

4. Apparatus in accordance with claim 3 wherein said transport means further comprises fan means connected between said second valve outlet and said second opening of said storage bin for generating a flow of air from said valve means to said storage bin, said second opening of said storage bin being disposed in said bin lower than said first opening of said storage bin, whereby materials stored in said bin are maintained in an agitated state.

5. Apparatus for weighing and discharging material such as down, feathers, and the like comprising:
a storage bin having an upper portion and a lower portion and having a bin outlet opening in said upper portion and a bin inlet opening in said lower portion;
a cylindrical drum container of a first diameter having its longitudinal axis disposed horizontally, having first and second vertical end walls, a container inlet opening in said first vertical wall of substantially smaller diameter than the diameter of said drum and a container outlet in said second vertical wall in substantially coaxial alignment along a said longitudinal axis and having a discharge outlet in the cylindrical wall and on one side of said container in proximity of the lower edge of said container and an air inlet in said cylindrical wall on said on side of said drum and in proximity of the upper edge of said container, said container having a freedom of movement in the vertical direction;

valve means having a valve inlet, first and second valve outlets, and a valve gate, said valve gate having a "fill" position wherein said valve inlet is in communication with said first valve outlet and a "by-pass" position wherein said valve inlet is in communication with said second valve outlet;

fan means connected between said bin outlet opening and said valve inlet for generating a flow of air from said bin outlet opening to said valve inlet;

said first valve outlet being connected to said container inlet opening and said second valve outlet being connected to said bin inlet opening;

indicator means for measuring the vertical displacement of said container and generating an output signal indicative of the weight of contents of said container, in correspondence with said vertical displacement;

selector means adjustable to generate an output signal indicative of a desired weight of the material;

comparator circuit means connected to said indicator means and said selector means for generating a first control signal when the weight of contents of said container equals said desired weight of material;

means for controlling the position of said valve gate and responsive to said first control signal to place said valve gate in said "by-pass" position and responsive to a second control signal to place said valve gate in said "fill" position;

switch means operable to generate a discharge control signal;

means responsive to said discharge control signal to remove said material from said container; and means activated in response to said discharge control signal for generating said second control signal when said material has been removed from said container.

6. Apparatus in accordance with claim 5 wherein said means for removing comprises a discharge nozzle, discharge fan means connected to said discharge outlet and said nozzle for generating a flow of air from said discharge outlet to said nozzle, power drive means, clutch means, and brake means;

said clutch means being operable to engage said power drive means and said discharge fan means in response to said discharge control signal and to disengage said power drive means from said fan means in response to said second control signal;

said brake means being operable to prevent operation of said fan means in response to said second control signal and to allow operation of said fan means in response to said discharge control signal.

7. Apparatus in accordance with claim 5 wherein said means for generating said second control signal comprises timer means for generating said second control signal a predetermined period of time after said activation.

8. Apparatus in accordance with claim 5 and further comprising at least one additional means adjustable to generate a signal indicative of a desired weight of material and sequencing means for applying said signal generated by said indicator means and said signal generated by said additional means to said comparator means in sequence.

* * * * *